(12) United States Patent
Labaj et al.

(10) Patent No.: US 10,067,840 B1
(45) Date of Patent: Sep. 4, 2018

(54) LIFE EXPECTANCY DATA MIGRATION

(71) Applicant: EMC IP Holding Company LLC, Hopkinton, MA (US)

(72) Inventors: Titani P. Labaj, Northborough, MA (US); Donald E. Labaj, Northborough, MA (US); Timothy J. Cox, Mendon, MA (US); Scott E. Joyce, Foxboro, MA (US); Kevin S. Labonte, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 14/673,913

(22) Filed: Mar. 31, 2015

(51) Int. Cl.
*G06F 11/00* (2006.01)
*G06F 11/14* (2006.01)
*G06F 11/20* (2006.01)
*G06F 11/30* (2006.01)

(52) U.S. Cl.
CPC ...... *G06F 11/1461* (2013.01); *G06F 11/1451* (2013.01); *G06F 11/1464* (2013.01); *G06F 11/2069* (2013.01); *G06F 11/2082* (2013.01); *G06F 11/3075* (2013.01); *G06F 2201/81* (2013.01); *G06F 2201/84* (2013.01)

(58) Field of Classification Search
CPC .................................................. G06F 11/1461
See application file for complete search history.

(56) References Cited

U.S. PATENT DOCUMENTS

| | | | | |
|---|---|---|---|---|
| 8,041,984 B2* | 10/2011 | Kalos | ................... | G06F 11/2094 714/3 |
| 9,047,239 B2* | 6/2015 | Kelkar | ..................... | G06F 12/16 |
| 9,244,790 B1* | 1/2016 | Ma | ....................... | G06F 11/2221 |
| 9,354,994 B2* | 5/2016 | Coronado | ............. | G06F 11/203 |
| 9,417,976 B2* | 8/2016 | Sugabrahmam | .... | G06F 11/1471 |
| 2005/0081087 A1* | 4/2005 | Yagisawa | .............. | G06F 11/008 714/6.22 |
| 2008/0189578 A1* | 8/2008 | Raghuraman | ......... | G06F 11/004 714/47.1 |
| 2009/0177918 A1* | 7/2009 | Abali | .................. | G06F 11/1092 714/6.32 |
| 2013/0346794 A1* | 12/2013 | Bartlett | ............... | G06F 11/2094 714/6.21 |
| 2015/0193325 A1* | 7/2015 | Harsan-Farr | .......... | G06F 11/008 702/186 |
| 2015/0205533 A1* | 7/2015 | Kelkar | .................... | G06F 12/16 711/102 |
| 2015/0331775 A1* | 11/2015 | Slik | .......................... | G06F 3/06 714/6.23 |
| 2015/0348054 A1* | 12/2015 | Ogawa | ............... | G06Q 10/0635 705/317 |

(Continued)

*Primary Examiner* — Christopher S McCarthy
(74) *Attorney, Agent, or Firm* — Muirhad and Saturnelli, LLC

(57) ABSTRACT

Described are techniques for performing data storage system management. First information may be collected on a first physical storage device. The first information may include one or more metrics related to failure of the first physical storage device. In accordance with the first information, it is determined whether the first physical storage device is considered at risk of failure. Responsive to determining that the first physical storage device is considered at risk of failure, data automatically migrated from the first physical storage device to a second physical storage device.

21 Claims, 6 Drawing Sheets

(56) References Cited

U.S. PATENT DOCUMENTS

2015/0363274 A1* 12/2015 Nanivadekar ....... G06F 11/1448
  707/654
2016/0292025 A1* 10/2016 Gupta ................... G06F 11/076

* cited by examiner

LIFE EXPECTANCY DATA MIGRATION

BACKGROUND

Technical Field

This application generally relates to data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of performing data storage system management comprising: collecting first information on a first physical storage device, said first information including one or more metrics related to failure of the first physical storage device; determining, in accordance with the first information, whether the first physical storage device is considered at risk of failure; and responsive to determining that the first physical storage device is considered at risk of failure, automatically migrating data from the first physical storage device to a second physical storage device. It may be determined that the first physical storage device is considered at risk of failure if the first information includes one or more values for the one or more metrics associated with expected physical storage device failure. The first physical storage device may be a media type having an expected lifetime based on a number of writes or erasures expected to occur prior to failure, and it may be determined that the first physical storage device is considered at risk of failure if the first information indicates any of: a remaining amount of writes or erasures expected prior to failure of the first physical storage device is less than a threshold amount, and an estimated number of days is less than a threshold number, wherein the estimated number of days indicates an expected amount of time prior to expected failure of the first physical storage device. The estimated number of days may be based on a remaining amount of writes or erasures expected prior to failure of the first physical storage device and an expected rate at which writes or erasures are performed to the first physical storage device. The expected rate at which writes or erasures are performed to the first physical storage device may be determined in accordance with observed I/O workload characteristics of I/O operations directed to the first physical storage device. The I/O workload characteristics may include any of a write I/O rate or write data transfer rate when writing to the first physical storage device. The first physical storage device may be a flash-based memory storage device. Migration of data from the first physical storage device to the second physical storage device may be planned in accordance with a schedule whereby migration is expected to complete prior to failure of the first physical storage device. The first physical storage device may be a rotating disk drive and the one or more metrics include any of temperature, humidity, environmental operating conditions of the first physical storage device, a number of bad sectors, a number of errors of one or more particular types and an associated frequency for each of the errors, and an age of the first physical storage device. Determining whether the first physical storage device is considered at risk of failure may include comparing the first information to predetermined information defining conditions associated with expected failure of a physical storage device. The predetermined information may include any of: information on particular physical storage device failure due to manufacturing, information on particular physical storage device failure due to known defects or problems, a threshold amount or frequency of an error occurrence, a threshold amount of bad sectors. The method may include receiving aggregated information regarding physical storage device failure and expected failure from a plurality of data storage systems; analyzing said aggregated information; determining, based on said analyzed aggregated information, a first threshold associated with a first of said one or more metrics, said first threshold indicating a threshold condition for the first metric indicating expected physical storage device failure; and updating said predetermined information to include the first threshold for the first metric used in determining whether a physical storage device is at risk for failure.

In accordance with another aspect of the invention is a system comprising: a processor; and a memory comprising code, that when executed, performs a method of performing data storage system management comprising: collecting first information on a first physical storage device, said first information including one or more metrics related to failure of the first physical storage device; determining, in accordance with the first information, whether the first physical storage device is considered at risk of failure; and responsive to determining that the first physical storage device is considered at risk of failure, automatically migrating data from the first physical storage device to a second physical storage device.

In accordance with another aspect of the invention is a computer readable medium comprising code stored thereon that, when executed, performs a method of data storage system management comprising: collecting first information on a first physical storage device, said first information including one or more metrics related to failure of the first physical storage device; determining, in accordance with the first information, whether the first physical storage device is considered at risk of failure; and responsive to determining that the first physical storage device is considered at risk of failure, automatically migrating data from the first physical storage device to a second physical storage device. It may be determined that the first physical storage device is considered at risk of failure if the first information includes one or more values for the one or more metrics associated with expected physical storage device failure. The first physical storage device may be a media type having an expected lifetime based on a number of writes or erasures expected to occur prior to failure, and it may be determined that the first physical storage device is considered at risk of failure if the first information indicates any of: a remaining amount of writes or erasures expected prior to failure of the first physical storage device is less than a threshold amount, and an estimated number of days is less than a threshold number, wherein the estimated number of days indicates an expected amount of time prior to expected failure of the first physical storage device. The estimated number of days may be based on a remaining amount of writes or erasures expected prior to failure of the first physical storage device and an expected rate at which writes or erasures are performed to the first physical storage device. The expected rate at which writes or erasures are performed to the first physical storage device may be determined in accordance with observed I/O workload characteristics of I/O operations directed to the first physical storage device. The I/O workload characteristics may include any of a write I/O rate or write data transfer rate when writing to the first physical storage device. The first physical storage device may be a flash-based memory storage device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
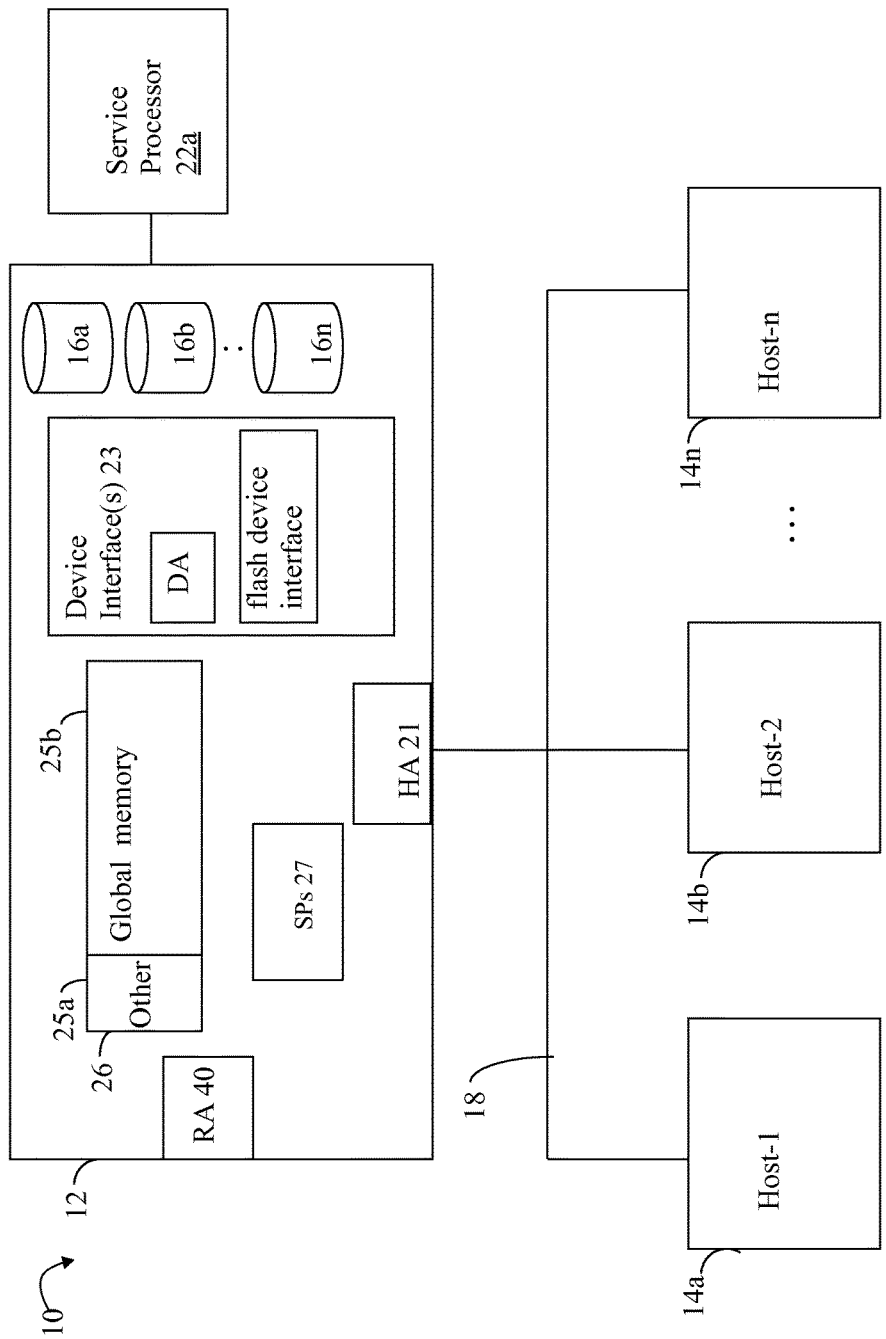
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
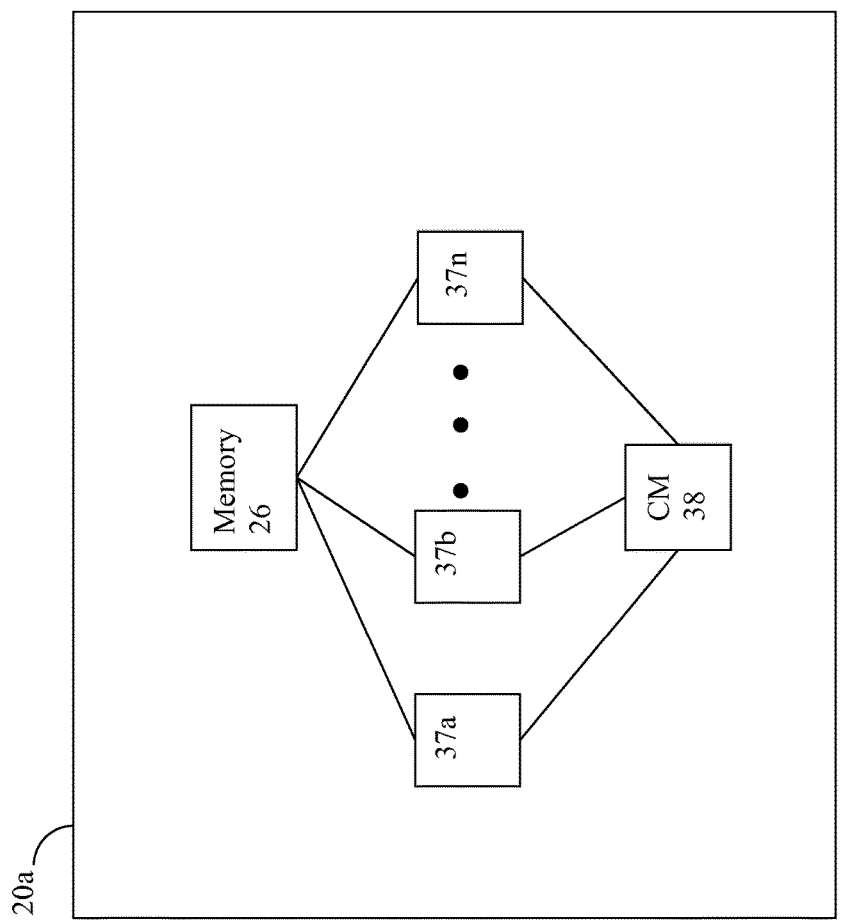
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP) and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. In the foregoing data storage array, the data storage devices 16a-16n may include a combination of disk devices and flash devices in which the flash devices may appear as standard Fibre Channel (FC) drives to the various software tools used in connection with the data storage array.

The physical storage devices 16a-n of FIG. 1 may include flash memory-based storage devices of one or more different types of flash drives, or one or more write endurance classifications. Different types of flash drives, such as SLC and MLC, have different write endurance. As known in the art, flash-based media experiences wear out based on the number of writes performed. Within a lifetime or usage period, the amount of writes that each type of flash, such as MLC or SLC, may be expected to successfully sustain varies. For example, SLC stores one bit of information or data per cell and may be the simplest of all flash types. Due to having only one bit per cell, it may therefore have the longest lasting of the flash types in an embodiment in accordance with techniques herein. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as an example of a type of flash having a higher write endurance than another type of flash media such as the MLC device. Generally, a flash-based memory device may have an expected lifetime expressed, for example, in a number of expected writes or erasure operation prior to expecting the device to experience failure whereby the device is no longer considered operable for data storage.

A flash memory-based storage device may have an expected lifetime (e.g., as measured in an amount of actual elapsed time such as a number of years, months, and/or days) based on a number of guaranteed write cycles, or program cycles, and a rate or frequency at which the writes are performed. To guarantee approximately the same lifetime of use (in terms of wall clock time) for different types of flash-based physical storage devices, such as SLC and MLC, a different number of allowable writes per day may be specified for each type of flash-based physical storage device (e.g., SLC, MLC, TLC) based on the write endurance variation of each type. In other words, different types of flash technology also have different wear levels.

Flash drives may have write endurance expressed in full drive writes per day based an expected lifetime of usage. For example, a 200 GB drive having N full drive writes per day (to last for a specified lifetime such as 5 years) may write 200*N GB per day. Thus, the writes/day may be characterized as an average amount of allowable writes/day in order to have the physical device operate for the specified lifetime such as 5 years.

It should be noted that although techniques described in following paragraphs may be illustrated with respect to flash memory-based storage devices, more generally, techniques herein may be applied in connection with any storage media and technology that has an expected lifetime or usage that is a function of the number of writes or program erasures made with respect to that physical device. For example, techniques herein may also be used in connection with phase-change memory (PCM) devices. PCM is also known in the art as PCME, PRAM, PCRAM, Ovonic Unified Memory, Chalcogenide RAM and C-RAM and is a type of non-volatile random-access memory. Generally, such a storage device, such as a flash memory-based storage device, that has an expected lifetime or usage that is a function of the number of writes or program erasures made with respect to that physical device may be characterized as having a "write capacity" denoting a total number of writes expected that the physical device can sustain during its operable lifetime. A remaining write capacity may denote an amount, portion or percentage of the such expected number of total writes remaining that have not yet been consumed whereby the remaining write capacity may decrease each time a write is made to the physical storage device. The remaining write capacity of a physical storage device (also referred to herein as % lifetime remaining) may be expressed, for example, as a percentage with respect to the write capacity or expected number of writes prior to PD failure, for the physical storage device.

Described in following paragraphs are techniques that may be used to facilitate ensuring user data availability. Physical storage devices, such as rotating disk drives, flash drives, and other forms of physical storage may be used to store user data. As with generally any component, physical storage devices (PDs) may experience or expect failure under certain conditions. Techniques in following paragraphs may use analytical data collected over a period of time to detect when physical storage device failure is expected, determine when a physical storage device may be deemed at risk of having a hardware failure, and the like. Thus, generally techniques herein may be used to collect data regarding a PD and where such techniques use the collected data to assess when the PD may be deemed at risk of an expected failure. Such collected information may include, for example, information regarding the amount of writes directed to a PD, and recorded environmental conditions, such as temperature, humidity and the like, that may affect the expected operable lifetime of PD. Such collected information may be analyzed to determine when the collected information indicates the PD is exhibiting behavior indicative of PD failure or expected PD failure and automatically take an action, such as automatically migrate data from the PD expected to fail prior to the user experiencing data loss or data unavailability due to PD failure.

In a configuration where the PD is included in a RAID group, the RAID group itself provides a level of data protection that varies with the RAID level or type (e.g., RAID-1, 5, 6, etc) of the RAID group. In this case, techniques herein may factor the particular RAID level or type along with collected information about the remaining healthy PDs of the RAID group in connection with deciding whether (and also when) to migrate data from an at risk PD that is a member of a RAID group. For example, a RAID-6 group can withstand a double PD failure in the group and the RAID group can internally rebuild or recover the information of the up to 2 failed PDs using data and double parity information of the remaining RAID-6 group healthy PDs. Assume a single PD is deemed at risk in a RAID-6 group and the remaining RAID-6 PDs are not deemed at risk. A decision may be made not to migrate data from the single PD since the RAID group would still be able to recover the data of the single PD even upon failure from the remaining PDs. However, consider a second case where three PDs are deemed at risk in a RAID-6 group. In this case, a decision may be made to migrate data from the 3 at risk PDs since the RAID-6 group can sustain at most a double PD failure and still rebuild.

Each PD has a typical life expectancy. By collecting critical analytics data about a PD over a period of time, techniques herein may be used to predict a possible PD failure and migrate the customer's data from that PD (e.g., disk drive, EFD, and the like) before an actual PD failure occurs. In at least one embodiment, such migration may occur as a background task or operation without the customer/user taking any action. Techniques herein may also be used, for example, at the data storage system level. For example, using similarly collected analytics data, processing may be performed to predict an expected failure or problem with the overall data storage system and, responsive to detecting such a condition, processing may be automatically performed to migrate customer data to another data storage system.

Thus, techniques herein may be used to automatically take an action, such as data migration, responsive to detecting an expected PD failure. By using the predicative analysis capability such as described herein, an action such as data migration may be performed to reduce the chance of data loss or data unavailability occurring.

Figure 3:
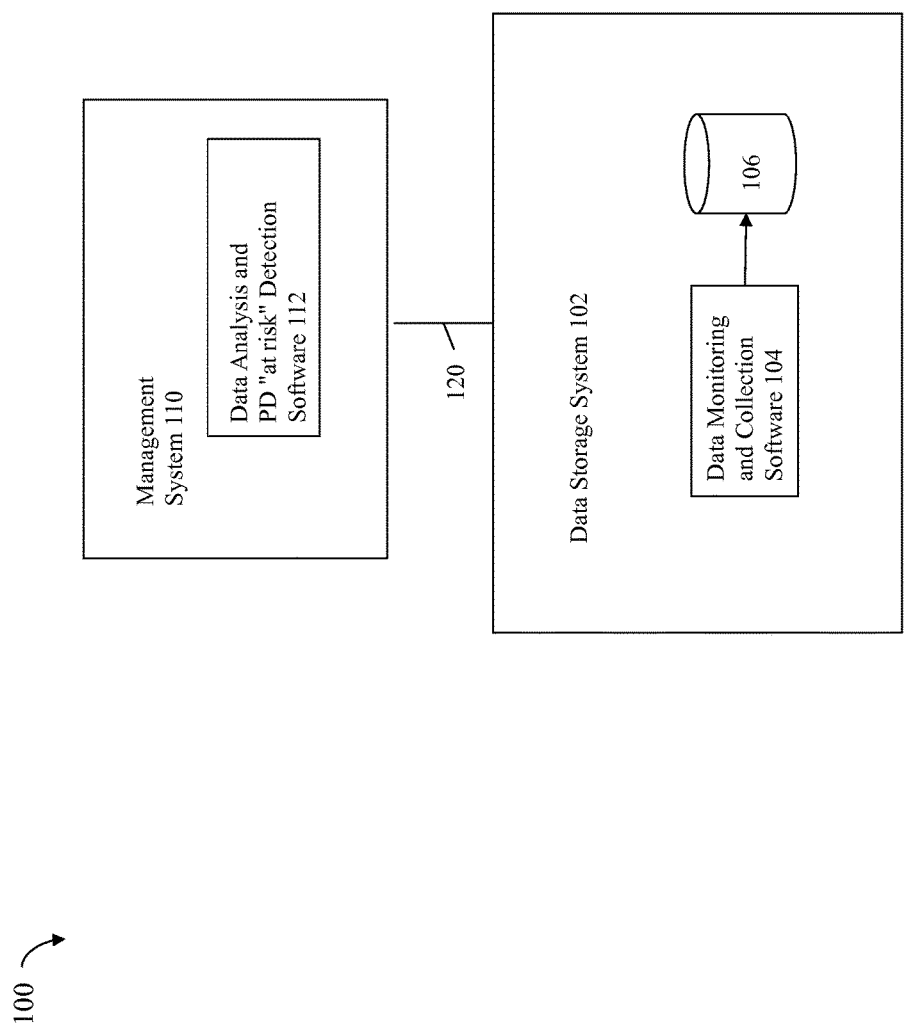
FIGS. 3 and 4 are examples illustrating components and configurations thereof that may be used in an embodiment in accordance with techniques herein.

Referring to FIG. 3, shown is an example of components that may be included in an embodiment in accordance with techniques herein. The example 100 includes management system 110 and data storage system 102. The data storage system 102 may be, for example, one or more data storage systems such as described elsewhere herein. The management system 110 may be a computer system connected to the data storage system 102. The management system 110 may include one or more software modules for management of the data storage system 102. For example, the management system 110 may include data analysis and PD "at risk" detection software 112. The systems 102 and 110 may communicate over connection 120 which may be any suitable network or other connection some of which are described herein. The data storage system 102 may include data monitoring and collection software 104 which collects information 106 regarding the PDs of the data storage system 102. Examples of such collected information 106 are described in more detail in following paragraphs. The software 104 may send (e.g., data push model) the collected information 106 to the data analysis and PD "at risk" detection software 112 of the management system 110 over connection 120. Alternatively, the software 112 may periodically retrieve the collected data 106 (e.g., data pull model).

It should be noted that although software 112 is illustrated as being included in management system 110, software 112, as well as other management software, may actually reside and execute on the data storage system 102 in an alternate configuration. In yet another alternative configuration, the software module 104 may also be located on the management system 110 and may collect the data 106 from the data storage system 102 over connection 120. Additionally, in some embodiments, data may be collected and stored on both the data storage system and also at a location besides the data storage system, such as on the management system 110. In such an embodiment, different types of information may be collected and stored at each location (e.g., the type of information stored on the data storage system may be different from that stored on the management system).

The data analysis and PD "at risk" detection software 112 may perform processing to analyze the collected data 106 and determine what one or more PDs, if any, are "at risk" of failure. Generally, in an embodiment in accordance with techniques herein, a PD may be deemed at risk of failure upon the occurrence or detection of one or more conditions associated with the PD. For example, a PD may be deemed at risk of failure if information collected for the PD indicates that the PD is exhibiting certain behavior or conditions known to indicate impending or expected PD failure. For example, a rotating disk drive experiencing particular errors or a particular frequency or number of errors of specified type(s) may be indicate that PD failure is expected (e.g., perhaps within an expected amount of time). As another example, if the PD is a flash storage device, the PD has an expected number of writes or erasures, E, that may be performed on the PD prior to the PD failure. If there have already been N writes or erasures performed on the PD, then there is a remaining expected lifetime of X–N writes or erasures prior to the PD failure. If X–N is less than a threshold, then the PD may be deemed at risk of impending failure. If writes or erasures are performed at a particular rate, such as a number of operations per day, the remaining expected lifetime of the PD may be expressed as remaining calendar days based on the expected rate and remaining expected writes or erasures. If the remaining calendar days is less than a threshold number of days, the PD may also be deemed at risk of failure. As described elsewhere herein, the foregoing may also factor in the size or amount of data to be migrated in connection with determining a start time to commence the data migration (e.g., for larger data sets, migration time may commence sooner than smaller data sets being migrated to ensure such migration is completed prior to PD failure).

Responsive to the data analysis and PD "at risk" detection software 112 determining that PD is "at risk" of failure, the software 112 may automatically cause one or more actions to be performed. As described below in more detail, such actions may include, for example, performing any one or more actions such as automatically migrating data from the "at risk" PD to another PD, sending an alert or notification to a user such as data storage administrator, and the like. Thus, the software 112 may perform processing to pre-emptively calculate and predict when PDs are likely to fail based on collected PD statistics and information. Failure of the PD may result in data loss or data unavailability. Generally, software 112 may perform processing to analyze collected information 106 and compare the analysis results to predetermined information indicating, for example, threshold conditions associated with "at risk" PDs. Such predetermined information may be based on a variety of different sources. For example, the predetermined information may include threshold levels of various indicators or metrics where such threshold levels may be based on manufacturer supplied information, average observed metric values associated with observed PD failure conditions, and the like.

In at least one embodiment, an initial set of the predetermined information may be installed on the management system 110 for use with techniques herein. The predetermined information may be periodically updated, for example, by the management system 110 communicating with an external site through a remote network connection (described elsewhere herein). The update applied to the predetermined information may, for example, include new information regarding additional manufacturing defects or failures of particular PDs, revised threshold values for metrics based on additional observations made regarding PD failures, a new metric or indicator associated with expected PD failure of a particular PD (e.g., having a particular manufacturer, media type, model number, and/or production batch), and the like.

Information collected 106 may include environmental conditions in which the PDs operate. The information collected 106 may include readings for temperature and/or humidity (e.g., ambient temperature and humidity in and around the PDs, where higher temperature and/or higher humidity above a threshold may indicate a condition that accelerates a rate of expected failure). Thus, observed readings for operating environmental conditions may be used to modify or adjust expected lifetime parameters associated with the PD. For example, a PD being used in operating environmental conditions outside of normal or expected ranges may accelerate PD failure. Such a PD may have an associated expected lifetime that is less than an average expected lifetime for other PDs of the same media type, model, and the like, which operate within the normal or expected ranges of the environmental conditions. For such a PD, the expected lifetime may be determined by further reducing the average expected lifetime typically experienced by similar PDs operating within the normal or expected ranges of the environmental conditions. For example, assume the PD is a rotating disk drive operating within the normal ranges of environmental conditions and has an expected lifetime of X years. Through previous analysis of previously collected and observed data, it may be known that frequently operating the PD in conditions outside the normal environmental conditions, such as at temperatures and/or humidity exceeding a specified threshold, causes the expected lifetime of the PD to be reduced by some amount, such as 20-30%. As such, the software 112 may determine a current age of the PD, such as Y years since manufacture date and may compare this age Y to the threshold age X to determine if the PD is at risk of failure. The predetermined information may indicate that for a PD of a particular media type such as rotating disk drive, model, manufacturer, and the like, the average expected lifetime is X years. Further the predetermined information may indicate that the average expected lifetime is reduced by, for example, 20% if environmental operating conditions of temperature and/or humidity are out of the normal ranges (e.g., temperature observed is greater than a threshold temperature). In this example, the collected data 106 may indicate that the observed average temperature data collected over period of time has consistently exceeded the threshold temperature and therefore the software 112 reduces the expected lifetime for the PD to 80%*X. If Y is equal to, or greater than 80%*X (or Y is within some specified threshold of 0.80*X), the PD may be determined to be "at risk" of failure.

The information collected 106 may include data regarding observed errors and/or warnings for the PDs (e.g., physical drive errors, errors when reading data from or writing data to the physical drives, trends regarding such errors and/or warnings observed over a time period for the PDs, recent errors and/or warnings received for the PDs). For disk drives, information collected 106 may include data regarding a number or percentage of bad sectors or portions of the PD media experiencing failure or error. For flash-based media, information 106 may include a collective number of writes/erasures performed during the entire operable life of the PD, a number writes/erasures remaining in the expected lifetime of the PD, and/or a percentage of PD lifetime remaining.

For a PD that is a flash-based media type, the predetermined information may specify baseline conditions such as regarding the expected number of writes/erasures to occur prior to PD failure. For a rotating disk drive, the predetermined information may specify base line conditions such as one or more failure indicators or thresholds such as a threshold number or percentage of bad sectors, a threshold frequency or number of errors when reading and/or writing data to PDs, or other errors typically indicating expected PD failure.

When one or more particular errors occur (as reflected in the collected information 106) and with a particular frequency, it may indicate that the PD may be expected to fail within a specified amount of time. In other words, the occurrence of such error(s) at the specified frequency is an indicator that the PD is likely to fail within a specified amount of time. As such, when observed PD behavior as reflected in the collected data 106 matches that of the baseline thereby indicating expected PD failure within a specified amount of time, an action may be taken to avoid data loss/data unavailability for data on the PD. For example, data may be automatically migrated from the PD expected to fail prior to the expected time of failure to avoid data loss or data unavailability.

The collected information 106 for a PD that is flash-based media type may include, for example, the total # writes/erasures that have occurred during the PD lifetime, duration of time over which #writes/erasures have occurred, current I/O pattern or workload characteristics (I/O rate or data transfer rate directed to PD for writes/erasures, read/write mixture) for I/Os directed to the PD. An embodiment may, for example, use the duration of time over which total #writes have occurred, the total # writes/erasures and I/O workload or pattern to predict a specified time at which the flash-based PD is expected to fail based on current I/O workload characteristics. For example, a first customer may write to an EFD an average of N writes per day and the EFD may have a remaining lifetime of X writes remaining or expected prior to EFD failure. Based on the foregoing, a calculation of X/N may provide an approximate expected lifetime in terms of a number of calendar days prior to when the EFD may be expected to fail.

In connection with performing the automated data migration responsive to determining a PD is "at risk", an estimate regarding the amount of time needed to complete the data migration may be known or calculated. For example, it may be estimated that an amount of time Y is needed to complete the data migration from a first PD expected to fail to a second PD. As such, the automated data migration may commence within a sufficient amount of time to allow the migration to complete prior to the expected failure of the first PD. For example, it may be expected to take 7 days to complete the data migration and the first PD may be expected to fail in 30 days. Thus, processing may be performed to start migration of the first PD at a suitable point in time to allow the migration to safely complete prior to the expected failure within 30 days. Thus, responsive to PD failure being predicted by determining the PD is "at risk", the data migration may be scheduled, as described above, to complete prior to the expected failure, if a time estimate of such expected failure can be determined.

Such data migration may be performed from a first PD to a second PD where the second PD may be have similar performance characteristics to the first PD. For example, a data storage system may have multiple storage tiers. Each storage tier may include PDs of different performance characteristics and capabilities than PDs of other tiers. For example, tier 1 (highest performance tier) may include EFDs, tier 2 (middle performance tier) may include 15K RPM rotating disk drives and tier 3 (lowest performance tier) may include 8.2 RPM rotating disk drives. If the first PD is an EFD, the second PD may be an EFD or in the same storage tier as the first PD. If there is no available second PD in the EFD tier, the second PD may selected from the storage tier having availability and performance characteristics closest to those of the first PD. For example, if there is no PD in the EFD tier available, the second PD may be selected as a PD from tier 2 rather than tier 1. Generally, an embodiment may specify rules regarding the target PD to which data of the failed PD is migrated. For example, in one embodiment such as described above, a rule may be specified that the target PD (e.g., such as the second PD) may belong to a storage tier that is the same as the source or failed PD or a lower performance storage tier than the failed PD (e.g., PD for which failure is expected or predicted).

The PD for which failure is expected or predicted may belong to a RAID group of a specified RAID level. As known in the art, a RAID group includes multiple PD drives providing different levels of data protection. For example, a RAID-1 group provides data mirroring and may include 2 PDs each including a duplicate copy of the written data. A RAID-5 group may include 4 PDs with 3 data PDs and 1 parity PD. Thus, at a point in time, it may be that only a single PD of the RAID group is determined "at risk" using techniques herein. In such a case, data migration may be performed for the single RAID group member to another PD of the same storage tier as the PD of RAID group deemed "at risk" for which failure is expected. For example, one PD of a RAID group may have particular errors occurring at a frequency indicative of impending PD failure. However the remaining RAID group PDs may not exhibit such errors. In this case, processing may be performed to migrate data of the single PD. As another example, a first PD of a RAID group may have a lower amount of remaining expected writes or erasures prior to failure than other PDs of the RAID group. The first PD may be expected to fail within a threshold amount of time (e.g., based on current rate of writes/erasures and based on remaining writes/erasures prior to PD failure). In this case, processing may be performed to migrate data of the single PD prior to expected failure but not migrate data of the other PDs of the RAID group.

As an alternative, for a single RAID group, techniques herein may determine that all PDs of the RAID group are at risk and expected to fail. For example, all PDs may have approximately the same remaining expected lifetime in terms of remaining expected writes or erasures prior to failure. The remaining expected lifetime of all PDs of the RAID group may be below a specified threshold level and may therefore be at risk of failure and requiring migration prior to the expected failure.

Figure 4:
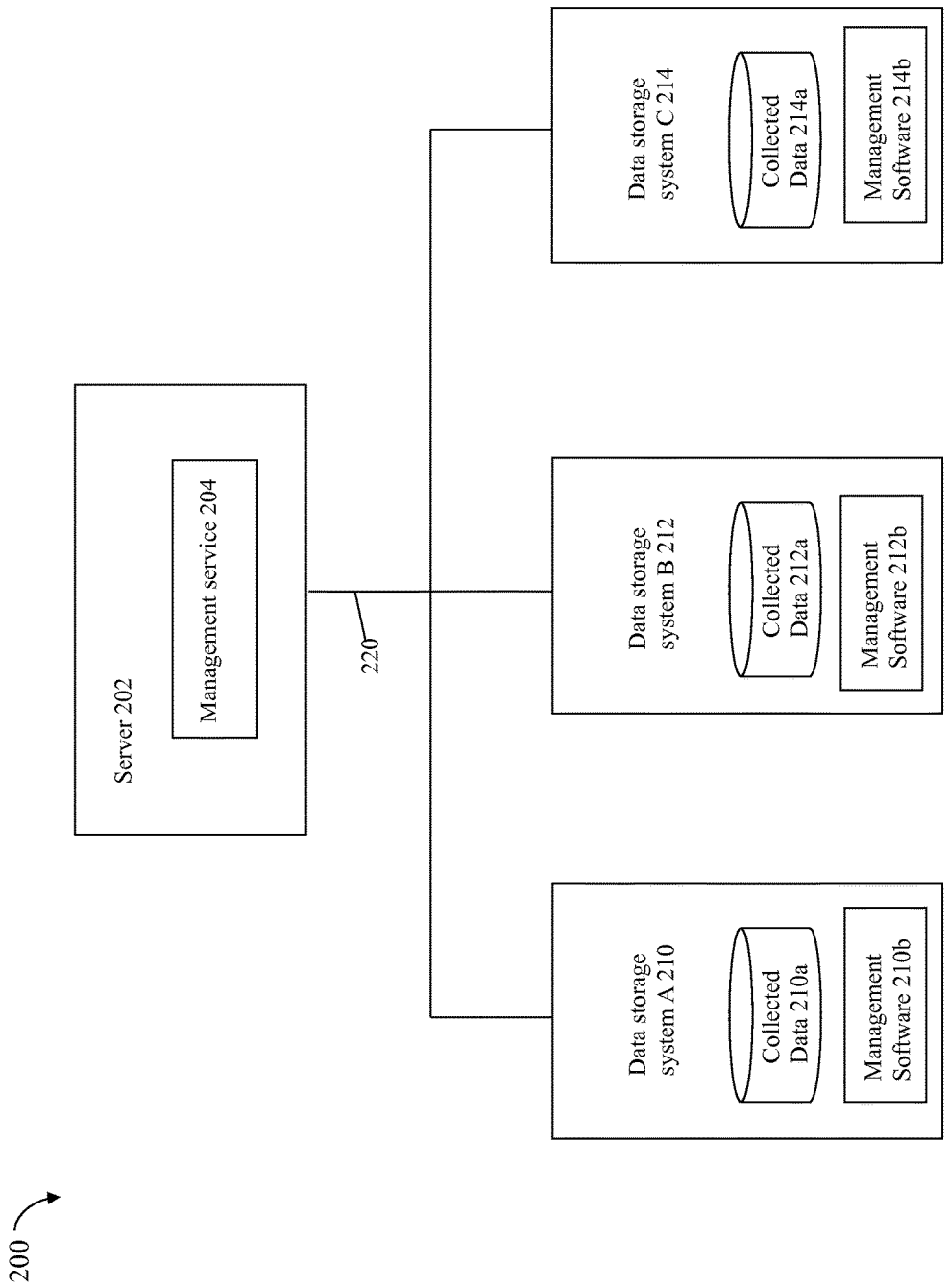

Referring to FIG. 4, shown is another example of components that may be included in an embodiment in accordance with techniques herein. The example 200 includes a server 202 with management service 204 and data storage system 210, 212 and 214. The server 202 may be a computer system. The data storage systems 210, 212 and 214 and the server 202 may communicate over network 220. In this example 200, each of the data storage systems 210, 212 and 214 may be systems of 3 different data storage system customers or users. The server 202 may be, for example, hosted by the data storage system manufacturer or a third party provider of the data storage systems 210, 212 and 214.

Data storage system 210 may include collected data 210a and management software 210b. The management software 210b may include various data storage system management software such as the data monitoring and collection software 104 and data analysis and PD "at risk" detection software 112. The collected data 210a may be similar to the collected information 106. The collected data 210a may be collected and used in connection with techniques herein as described above for the data storage system 210.

Data storage system 212 may include collected data 212a and management software 212b. The management software 212b may include various data storage system management software such as the data monitoring and collection software 104 and data analysis and PD "at risk" detection software 112. The collected data 212a may be similar to the collected information 106. The collected data 212a may be collected and used in connection with techniques herein as described above for the data storage system 212.

Data storage system 214 may include collected data 214a and management software 214b. The management software 214b may include various data storage system management software such as the data monitoring and collection software 104 and data analysis and PD "at risk" detection software 112. The collected data 214a may be similar to the collected information 106. The collected data 214a may be collected and used in connection with techniques herein as described above for the data storage system 210.

Each of the data storage systems 210, 212 and 214 may periodically report their collected data 210a, 212a, 214a to the management service 204. One function of the management service 204 is to aggregate collected data regarding PDs and perform collective analysis on the aggregated data from multiple customer data storage systems. The management service 204 may also receive updated information from manufacturers regarding known PD failures, problems or conditions affecting expected PD lifetime and failure. For example, the management service 204 may periodically receive updated information regarding particular manufactured PD models or batches having known problems or defects affecting the PD failure. Generally, based on other information such as the updated manufacturer information, aggregated customer data, and the like, the management service 204 may further revise or update any baseline information such as threshold conditions and metrics indicating expected PD failure. The management service 204 may provide such updated or revised information to the data storage systems 210, 212 and 214 for use in local analysis at each data storage system by module 112 when determining whether a PD is "at risk" of failure.

The aggregated information including 210a, 212a, 214a collected by the management service 204 may be analyzed to provide information such as trending or expected failure or lifetime with respect to PDs of such multiple data storage systems and customers. For example, such aggregated information may identify particular errors and an associated frequency of the errors observed prior to a PD failure occurring at customer data storage systems, an amount of time prior to PD failure when the foregoing errors and associated frequency was observed, and the like. Thus, such aggregated information may be analyzed to provide a more complete list of errors, determine a new or revised threshold level such as an associated frequency indicative of PD failure and remaining PD lifetime, and the like. For example, such aggregated information may indicate that, for multiple customers on multiple data storage systems, PD failure for a particular type of storage device occurred with a specified amount of time after certain conditions or behavior was observed. Such observed conditions may include, for example, observing a particular amount, frequency or rate of particular error(s) (e.g., when at least a threshold number or frequency of errors occurs when reading and/or writing data to the PD, the PD is expected to fail within X amount of time). The analysis of such observed collected data 210a, 212a, and 214a (e.g., aggregated information) may result in revising or modifying an original set of information, such as an original set of predetermined information described elsewhere herein that may be initially located and used locally by software module 112 in determining "at risk" PDs. The updated or revised information as determined by the management service 204 may be periodically provided to each of the 3 customers and their data storage systems 210, 212 and 214 for data storage system management.

Through aggregated data collection from multiple customer data storage systems at different geographical locations and operating in different environmental conditions, analysis performed by the management service 204 may indicate that particular geographic locations and/or environmental conditions are associated with premature PD failure or, alternatively, extended PD lifetime. For example, analysis of the aggregated data may indicate that customer data storage systems in geographic location A or operating with a particular set of environmental conditions experienced a shorter than expected PD lifetime (e.g., failure occurred earlier than expected). Such analysis results may be provided to the customer data storage systems at their local sites for use in determining "at risk" PDs by software 112.

As noted above, an embodiment in accordance with techniques herein may ship each of the data storage systems 210, 212, 214 with a set of predetermined information including, for example, generic defaults or expected lifetime information for PDs. A customer data storage system may or may not choose to participate and communicate with the external management service 204 and site 202. By participating in the management services of 204, a customer's data storage system, such as data storage system 210, may agree to provide collected data 210a to the management service 204 which is aggregated along with other collected information (e.g., such as 212a, 214a) from other data storage systems (e.g., such as 212, 214) and then analyzed for a more global overview of expected PD failure conditions and associated timing, expected PD lifetime, and the like. The management service 204 may also receive periodic updates, for example, from manufacturers regarding reported PD failures, problems, and the like. The additional information regarding the periodic updates, analysis of the aggregated customer data storage information, and the like, may also be sent to the individual customer data storage systems for use locally. For example, analysis of the aggregated customer data storage system information may provide an expanded list of expected PD errors or warnings and associated frequency when a PD is expected to fail within a predetermined amount of time, may provide revised or updated information regarding an amount of time remaining prior to PD failure once particular errors or conditions are observed, and the like.

It should be noted that in FIG. 4, each customer data storage system 210, 212 and 214 is illustrated as including the management software and collected data. However, each of the data storage systems 210, 212, 214 may alternatively include one or more software modules of the management software on a separate management system such as described and illustrated elsewhere herein in connection with FIG. 3.

Figure 5:
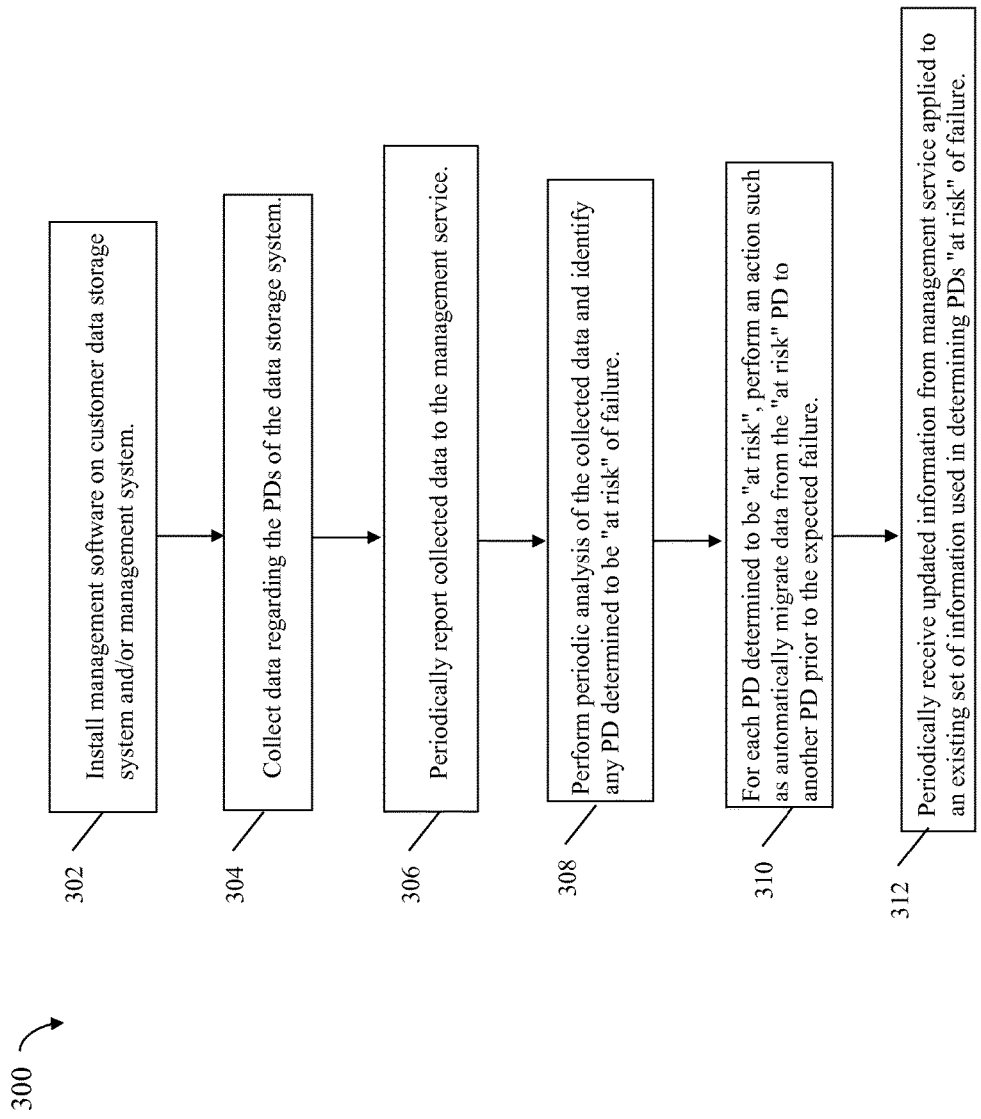
FIGS. 5 and 6 are flowcharts of processing steps that may be performed in an embodiment in accordance with techniques herein.

Referring to FIG. 5, shown is a first flowchart of processing steps that may be performed in an embodiment in accordance with techniques herein. The flowchart 300 summarizes processing as described above that may be performed on a customer's data storage system to determine PDs "at risk" of failure. At step 302, the management software may be installed on the customer data storage system and/or management system depending on the particular customer configuration. It should be noted that such an installation may be performed at the customer site, or otherwise pre-installed prior to being received by the data storage system customer. At step 304, data is collected on the data storage system regarding the PDs. At step 306, processing may be performed to periodically report the collected data to the management service, such as the external management service 204 of FIG. 4. At step 308, processing may be performed to periodically perform a local analysis at the customer data storage system to identify any PD determined to be "at risk" of failure. At step 310, for each PD determined to be "at risk", perform an action such as automatically migrate data from the "at risk" PD to another PD prior to the expected failure. At step 312, the customer data storage system may periodically receive updated information from the management service. Such updated information may add new information or revise existing information used in determining PDs "at risk" of failure.

Figure 6:
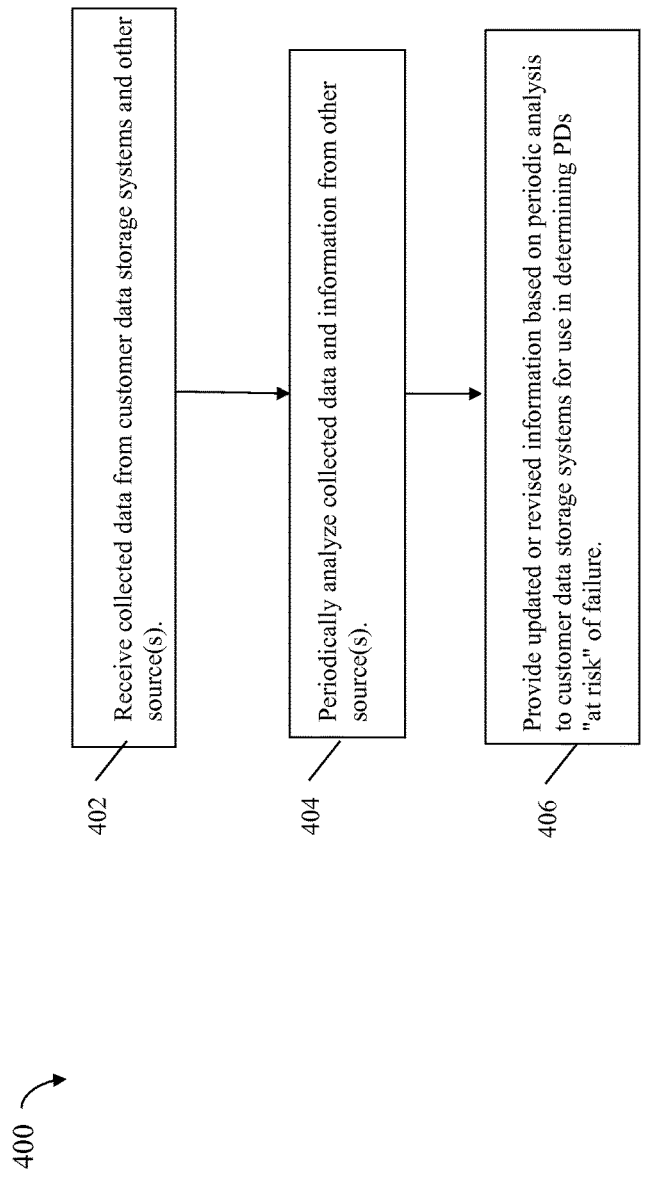

Referring to FIG. 6, shown is a second flowchart of processing steps that may be performed in an embodiment in accordance with techniques herein. The flowchart 400 summarizes processing as described above that may be performed by the management service, such as the management service 204 of FIG. 4. At step 402, the management service may receive collected data from customer data storage systems as well as one or more other sources. The other sources may include, for example, a manufacturer or third party providing updated or current information such as regarding revised conditions or thresholds associated with expected PD failure or lifetime, current information regarding known PD failures or defects such as in particular PD models or drive types, problems affecting PD failure in particular manufactured batches or lots of PDs, and the like. At step 404, processing may be performed to periodically analyze the collected data and information from other source(s). At step 406, processing may be performed to provide updated or revised information based on the periodic analysis of step 404 to customer data storage systems for use in determining PDs "at risk" of failure.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data storage system management comprising:
    collecting first information on a first physical storage device, said first information including environmental operating conditions denoting at least one of temperature and humidity in which the first physical storage device has been operating, and one or more metrics related to failure of the first physical storage device;
    performing processing that determines, prior to actual failure of the first physical storage device, whether the first physical storage device is considered at risk of an expected failure, wherein said processing includes determining a first expected lifetime of the first physical storage device by reducing a predetermined expected lifetime based on the first information; and
    responsive to determining, prior to actual failure of the first physical storage device, that the first physical storage device is considered at risk of the expected failure, performing first processing including:
        determining whether the first physical storage device is included in a RAID group having a current number of physical storage devices, that have not yet experienced device failure and are considered at risk of expected failure, where the current number exceeds a specified maximum number of physical device failures denoting a maximum number of device failures for which the RAID group is capable of performing an internal RAID group rebuild to recover information using information on remaining physical storage devices of the RAID group that have not failed;
        responsive to determining the first physical storage device is included in the RAID group where the current number exceeds the specified maximum number denoting a maximum number of device failures for which the RAID group is capable of performing an internal RAID group rebuild using information on remaining physical storage devices of the RAID group that have not failed, automatically migrating data from the first physical storage device to a second physical storage device, wherein said migrating is performed prior to the expected failure of the first physical storage device; and
        responsive to determining the first physical storage device is in the RAID group where the current number of physical storage devices of the RAID group, that have not yet experienced device failure and are considered at risk of expected failure, does not exceed the specified maximum number denoting a maximum number of device failures for which the RAID group is capable of performing an internal RAID group rebuild, determining not to migrate data from the first physical storage device to the second physical storage device.

2. The method of claim 1, wherein it is determined that the first physical storage device is considered at risk of the expected failure if the first information includes one or more values for the one or more metrics associated with expected physical storage device failure.

3. The method of claim 1, wherein the first physical storage device is a media type having an expected lifetime based on a number of writes or erasures expected to occur prior to failure, and wherein it is determined that the first physical storage device is considered at risk of the expected failure if the first information indicates any of: a remaining amount of writes or erasures expected prior to failure of the first physical storage device is less than a threshold amount, and an estimated number of days is less than a threshold number, wherein the estimated number of days indicates an expected amount of time prior to expected failure of the first physical storage device.

4. The method of claim 3, wherein the estimated number of days is based on a remaining amount of writes or erasures expected prior to failure of the first physical storage device and an expected rate at which writes or erasures are performed to the first physical storage device.

5. The method of claim 4, wherein the expected rate at which writes or erasures are performed to the first physical storage device is determined in accordance with observed I/O workload characteristics of I/O operations directed to the first physical storage device.

6. The method of claim 5, wherein the I/O workload characteristics include any of a write I/O rate or write data transfer rate when writing to the first physical storage device.

7. The method of claim 3, wherein the first physical storage device is a flash-based memory storage device.

8. The method of claim 3, wherein migration of data from the first physical storage device to the second physical storage device is planned in accordance with a schedule whereby migration is expected to complete prior to failure of the first physical storage device.

9. The method of claim 1, wherein the first physical storage device is a rotating disk drive and the one or more metrics include any of a number of bad sectors, a number of errors of one or more particular types and an associated frequency for each of the errors, and an age of the first physical storage device.

10. The method of claim 1, said determining whether the first physical storage device is considered at risk of the expected failure includes:
comparing said first information to predetermined information defining conditions associated with expected failure of a physical storage device.

11. The method of claim 10, wherein the predetermined information includes any of:
information on particular physical storage device failure due to manufacturing, information on particular physical storage device failure due to known defects or problems, a threshold amount or frequency of an error occurrence, a threshold amount of bad sectors.

12. The method of claim 11, further comprising:
receiving aggregated information regarding physical storage device failure and expected failure from a plurality of data storage systems;
analyzing said aggregated information;
determining, based on said analyzed aggregated information, a first threshold associated with a first of said one or more metrics, said first threshold indicating a threshold condition for the first metric indicating expected physical storage device failure; and
updating said predetermined information to include the first threshold for the first metric used in determining whether a physical storage device is at risk for failure.

13. The method of claim 1, wherein the RAID level of the RAID group is RAID-6 and the specified maximum number of physical drive failures for which the RAID group is capable of performing an internal RAID group rebuild is two.

14. A system comprising:
a processor; and
a memory comprising code, that when executed, performs a method of performing data storage system management comprising:
collecting first information on a first physical storage device, said first information including environmental operating conditions denoting at least one of temperature and humidity in which the first physical storage device has been operating, and one or more metrics related to failure of the first physical storage device;
performing processing that determines, prior to actual failure of the first physical storage device, whether the first physical storage device is considered at risk of an expected failure, wherein said processing includes determining a first expected lifetime of the first physical storage device by reducing a predetermined expected lifetime based on the first information; and
responsive to determining, prior to actual failure of the first physical storage device, that the first physical storage device is considered at risk of the expected failure, performing first processing including:
determining whether the first physical storage device is included in a RAID group having a current number of physical storage devices, that have not yet experienced device failure and are considered at risk of expected failure, where the current number exceeds a specified maximum number of physical device failures denoting a maximum number of device failures for which the RAID group is capable of performing an internal RAID group rebuild to recover information using information on remaining physical storage devices of the RAID group that have not failed;
responsive to determining the first physical storage device is included in the RAID group where the current number exceeds the specified maximum number denoting a maximum number of device failures for which the RAID group is capable of performing an internal RAID group rebuild using information on remaining physical storage devices of the RAID group that have not failed, automatically migrating data from the first physical storage device to a second physical storage device, wherein said migrating is performed prior to the expected failure of the first physical storage device; and
responsive to determining the first physical storage device is in the RAID group where the current number of physical storage devices of the RAID group, that have not yet experienced device failure and are considered at risk of expected failure, does not exceed the specified maximum number denoting a maximum number of device failures for which the RAID group is capable of performing an internal RAID group rebuild, determining not to migrate data from the first physical storage device to the second physical storage device.

15. A non-transitory computer readable medium comprising code stored thereon that, when executed, performs a method of data storage system management comprising:
collecting first information on a first physical storage device, said first information including environmental operating conditions denoting at least one of temperature and humidity in which the first physical storage device has been operating, and one or more metrics related to failure of the first physical storage device;
performing processing that determines, prior to actual failure of the first physical storage device, whether the first physical storage device is considered at risk of an expected failure, wherein said processing includes determining a first expected lifetime of the first physical storage device by reducing a predetermined expected lifetime based on the first information; and
responsive to determining, prior to actual failure of the first physical storage device, that the first physical storage device is considered at risk of the expected failure, performing first processing including:
    determining whether the first physical storage device is included in a RAID group having a current number of physical storage devices, that have not yet experienced device failure and are considered at risk of expected failure, where the current number exceeds a specified maximum number of physical device failures denoting a maximum number of device failures for which the RAID group is capable of performing an internal RAID group rebuild to recover information using information on remaining physical storage devices of the RAID group that have not failed;
    responsive to determining the first physical storage device is included in the RAID group where the current number exceeds the specified maximum number denoting a maximum number of device failures for which the RAID group is capable of performing an internal RAID group rebuild using information on remaining physical storage devices of the RAID group that have not failed, automatically migrating data from the first physical storage device to a second physical storage device, wherein said migrating is performed prior to the expected failure of the first physical storage device; and
    responsive to determining the first physical storage device is in the RAID group where the current number of physical storage devices of the RAID group, that have not yet experienced device failure and are considered at risk of expected failure, does not exceed the specified maximum number denoting a maximum number of device failures for which the RAID group is capable of performing an internal RAID group rebuild, determining not to migrate data from the first physical storage device to the second physical storage device.

16. The non-transitory computer readable medium of claim 15, wherein it is determined that the first physical storage device is considered at risk of the expected failure if the first information includes one or more values for the one or more metrics associated with expected physical storage device failure.

17. The non-transitory computer readable medium of claim 15, wherein the first physical storage device is a media type having an expected lifetime based on a number of writes or erasures expected to occur prior to failure, and wherein it is determined that the first physical storage device is considered at risk of the expected failure if the first information indicates any of: a remaining amount of writes or erasures expected prior to failure of the first physical storage device is less than a threshold amount, and an estimated number of days is less than a threshold number, wherein the estimated number of days indicates an expected amount of time prior to expected failure of the first physical storage device.

18. The non-transitory computer readable medium of claim 17, wherein the estimated number of days is based on a remaining amount of writes or erasures expected prior to failure of the first physical storage device and an expected rate at which writes or erasures are performed to the first physical storage device.

19. The non-transitory computer readable medium of claim 18, wherein the expected rate at which writes or erasures are performed to the first physical storage device is determined in accordance with observed I/O workload characteristics of I/O operations directed to the first physical storage device.

20. The non-transitory computer readable medium of claim 19, wherein the I/O workload characteristics include any of a write I/O rate or write data transfer rate when writing to the first physical storage device.

21. The non-transitory computer readable medium of claim 17, wherein the first physical storage device is a flash-based memory storage device.

* * * * *